United States Patent [19]

Kramer

[11] Patent Number: 5,143,531
[45] Date of Patent: Sep. 1, 1992

[54] HERMETIC FIBER OPTIC-TO-METAL CONNECTION TECHNIQUE

[75] Inventor: Daniel P. Kramer, Centerville, Ohio

[73] Assignee: The United States of America as represented by the United States Department of Energy, Washington, D.C.

[21] Appl. No.: 683,019

[22] Filed: Apr. 10, 1991

[51] Int. Cl.[5] .............................................. C03C 25/02
[52] U.S. Cl. .................................... 65/3.11; 65/42; 65/59.34; 65/61; 65/45; 385/78; 385/85
[58] Field of Search ........................ 385/78, 76, 77, 85; 65/3.11, 42, 43, 54, 59.1, 59.34, 59.4, 61, 139, 45, 48, 49; 264/1.2, 1.5

[56] References Cited

U.S. PATENT DOCUMENTS

| | | | |
|---|---|---|---|
| 4,135,781 | 1/1979 | Archer | 385/85 |
| 4,648,688 | 3/1987 | Ashman et al. | 385/85 |
| 4,666,237 | 5/1987 | Mallinson | 385/85 |
| 4,729,624 | 3/1988 | Kakii et al. | 385/78 |
| 4,802,178 | 1/1989 | Ury | 372/36 |
| 4,815,809 | 3/1989 | Szostak | 350/96.20 |
| 4,846,544 | 7/1989 | Bortolin et al. | 350/96.21 |
| 4,850,664 | 7/1989 | Iri et al. | 385/85 |
| 4,925,266 | 5/1990 | Huebscher et al. | 385/78 |
| 4,994,134 | 2/1991 | Knecht et al. | 385/78 |

FOREIGN PATENT DOCUMENTS 62-131210 6/1987 Japan .
63-109409 5/1988 Japan .

Primary Examiner—John J. Bruckner
Attorney, Agent, or Firm—Armand McMillan; James H. Chafin; William R. Moser

[57] ABSTRACT

A glass-to-glass hermetic sealing technique is disclosed which can be used to splice lengths of glass fibers together. A solid glass preform is inserted into the cavity of a metal component which is then heated to melt the glass. An end of an optical fiber is then advanced into the molten glass and the entire structure cooled to solidify the glass in sealing engagement with the optical fiber end and the metal cavity. The surface of the re-solidified glass may be machined for mating engagement with another component to make a spliced fiber optic connection. The resultant structure has a helium leak rate of less than $1 \times 10^{-8}$ cm$^3$/sec.

4 Claims, 1 Drawing Sheet

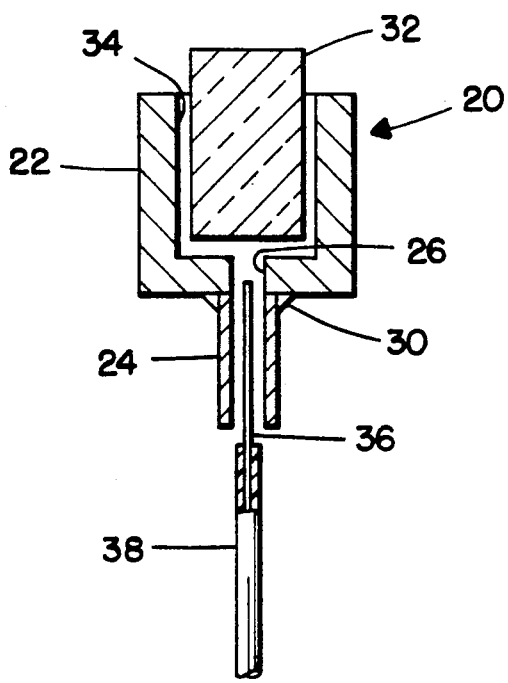
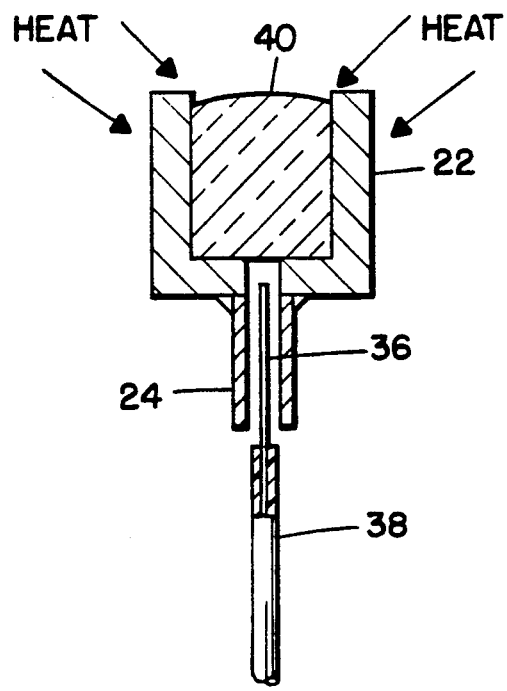
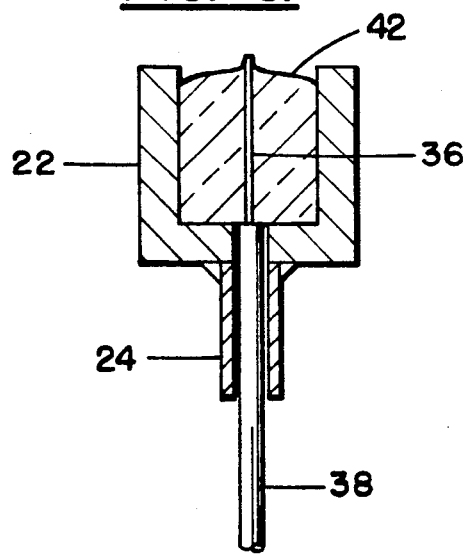
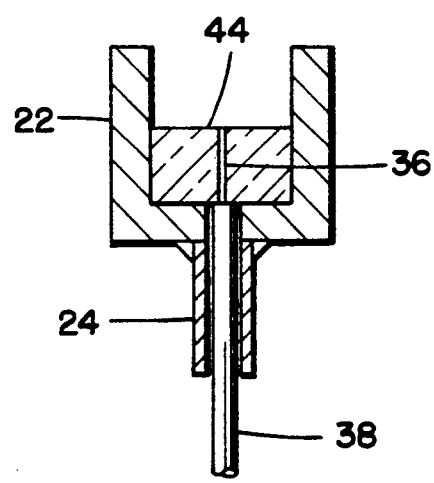
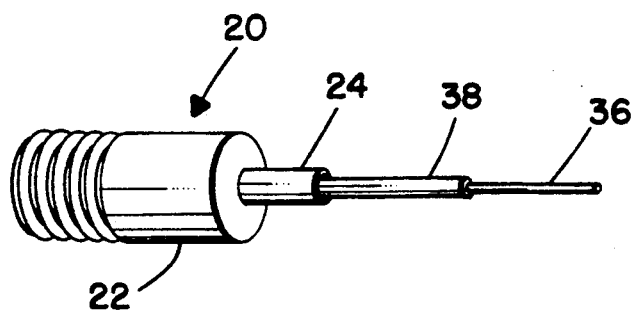

HERMETIC FIBER OPTIC-TO-METAL CONNECTION TECHNIQUE

BACKGROUND OF THE INVENTION

The United States Government has rights in this invention pursuant to Contract No. DE-AC04-88DP43495 awarded by the U.S. Department of Energy to EG&G Mound Applied Technologies.

FIELD OF THE INVENTION

The present invention relates generally to a technique for sealingly engaging an end of an optical fiber to a first metal component to subsequently enable the making of a spliced connection with a second metal component.

DESCRIPTION OF THE PRIOR ART

The application of fiber optics for a particular use is dependent on the requirement of being able to connect or splice one length of glass fiber to another length. These connections have in the past been performed in a number of ways. An example of this is the use of a metal component that contains a threaded nut. The fiber is passed through a hole in the metal component and is glued into place. The nut may be used to attach the assembly to another assembly. In this manner a connection or splice can be made and, if the alignment between the two ends is good, information in the form of light pulses can pass between the fibers.

However, in all previous uses of this technology, the connection or splice has not been hermetic to the degree that is necessary for certain types of components, which is helium-leak-tightness to less than $1 \times 10^{-8}$ cm$^3$/sec. This non-hermeticity occurs since the fiber is bonded to the metal connector with glue. The glass fibers are typically very thin (about 0.008 inch) and they deform upon the application of normal glass sealing temperatures; therefore the sealing of optical fibers with glasses has not been successful. Another example descriptive of known techniques of attaching optical fibers to metal components is disclosed in U.S. Pat. No. 4,802,178. In this instance, an optical fiber is soldered into place on a laser module. Again, the afore-mentioned drawbacks apply.

SUMMARY OF THE INVENTION

This disclosure provides an example of a novel sealing technique which has been used to seal fibers into components in such a manner that the components are hermetic (measured helium leak rate of less than $1 \times 10^{-8}$ cm$^3$/sec). The fabrication of hermetic fiber optic components has numerous commercial applications such as in telephone communications. In the fiber insertion technique of the present invention, the metal piece part (i.e., shell, connector, etc.) is heated with the sealing glass in place within the piece part. After the glass has melted, a fiber is pushed through a hole in the metal shell and through the molten glass, forming the hermetic seal upon cooling. The advantage of this technique is that the fiber is never heated directly and the sealing operation is completed in a matter of seconds. Therefore, the fiber does not deform or degrade upon the application of heat; and the plastic buffer, which is meant to protect the fiber from moisture and abrasion, is left relatively intact.

Other features and benefits of the glass-to-glass sealing technique of the invention include the fact that it does not require the use of any foreign sealing materials such as solder. This is particularly desirable since solders such as indium/tin could not be used in pyrotechnic components since they contain a flux which would cause various compatibility and corrosion problems. Also, solders have very low melting temperatures, which greatly limits the application range of the seal.

Other and further features, advantages, and benefits of the invention will become apparent in the following description taken in conjunction with the following drawings. It is to be understood that the foregoing general description and the following detailed description are exemplary and explanatory but are not to be restrictive of the invention. The accompanying drawings which are incorporated in and constitute a part of this invention, illustrate one of the embodiments of the invention, and, together with the description, serve to explain the principles of the invention in general terms. Like numerals refer to like parts throughout the disclosure.

BRIEF DESCRIPTION OF THE DRAWINGS

FIG. 1 is a diagrammatic side elevation view, in section, illustrating an initial step in the technique of the invention;

FIGS. 2, 3, and 4 are diagrammatic views, similar to FIG. 1, illustrating successive steps in the technique of the invention; and FIG. 5 is a perspective view illustrating a component resulting from the technique of the invention.

DESCRIPTION OF THE PREFERRED EMBODIMENTS

Turn now to the drawings. The four-step sequence of the technique of the invention is shown in FIGS. 1-4. The completed component 20 is shown in FIG. 5. By way of example, this particular component consists of a 304 L stainless steel sleeve 22 that was modified to accept a 0.125-inch-diameter feeder tube 24. The feeder tube 24 is preferably fabricated from Kovar, an alloy having a favorable coefficient of thermal expansion for forming a glass to metal seal. The feeder tube is suitably attached to the sleeve 22 so as to communicate with a minor opening 26 (FIG. 1) into a cavity 28. Attachment may be by way of brazing 30.

During fabrication of the component 20 (FIG. 1), a solid glass preform 32 is placed through a major opening 34 into the cavity 28 of the shell. The glass preform is of a predetermined size corresponding to the size of the cavity 28 and chosen to assure that it will not overflow the sidewalls of the cavity. Heat is then applied to the preform (FIG. 2), as by a propane torch. The glass used has a softening point of about 780° C. and a coefficient of thermal expansion of about $100 \times 10^{-7}$ cm/cm/°C. between room temperature and 500° C. However, this glass composition is not critical for this fabrication process as other similar glass compositions could be successfully used.

After the glass is molten (which takes approximately one minute) the heat is removed, and a fiber 36 is inserted through the feeder tube 24 and minor opening 26 and into molten glass 40, forming the seal. A commercially available 100/140-micron step fiber with a protective plastic buffer 38 is suitable for purposes of the invention. A sufficient amount of the buffer 38 is removed to enable proper insertion into the molten glass. Thereafter, the resulting assembly is permitted to cool (FIG. 3) resulting in a sealed connection between the fiber 36 and the resolidified glass 42 as well as a sealed connection between the sleeve 22 and the resolidified glass 42. In order to enable operational engagement of the completed component 20 with a mating component and thereby make a spliced fiber optic connection, a terminal surface 44 may be machined, as shown in FIG. 4.

Components fabricated using this technique have been helium leak tested and were determined to be hermetic with a leak rate of less than $1 \times 10^{-9}$ cm$^3$/sec. Applications of this process within the fiber optic community are numerous, and it is easy to perceive of various commercial applications such as headers, actuators, and ignitors.

While a preferred embodiment of the invention has been disclosed in detail, it should be understood by those skilled in the art that various other modifications may be made to the illustrated embodiment without departing from the scope of the invention as described in the specification and defined in the appended claims.

I claim:

1. A method of hermetically sealing an optical fiber into a metal component, comprising the steps of:
   (a) placing a quantity of molten glass into a cup-like cavity in the metal component;
   (b) inserting an end of an optical fiber from a remote location into the molten glass through a minor opening at the bottom of the cup-like cavity;
   (c) cooling the glass to solidify it and form a seal between the solidified glass, the optical fiber end, and the metal component.

2. The method of claim 1, wherein the glass placed into the cup-like cavity is in the shape of a solid preform and is then melted by the application of sufficient heat to the metal component.

3. A method as set forth in claim 2, wherein the glass preform is of a predetermined size and coextensive with the cup-like cavity of the metal component.

4. A method as set forth in claim 1 in which a helium leak rate of less than $1 \times 10^{-8}$ cm$^3$/sec is achieved in the seal between the solidified glass and the optical fiber end.

* * * * *